United States Patent
Kolpin

(10) Patent No.: US 6,508,511 B1
(45) Date of Patent: Jan. 21, 2003

(54) ATV REAR GEAR BAG

(75) Inventor: Ronald N. Kolpin, Berlin, WI (US)

(73) Assignee: Kolpin Outdoors, Inc., Fox Lake, WI (US)

( * ) Notice: Subject to any disclaimer, the term of this patent is extended or adjusted under 35 U.S.C. 154(b) by 0 days.

(21) Appl. No.: 09/711,273

(22) Filed: Nov. 13, 2000

(51) Int. Cl.$^7$ ................................. A47C 1/08
(52) U.S. Cl. ............. 297/256.16; 297/380; 297/188.01
(58) Field of Search .................. 297/188.01, 250.1, 297/256.16, 380, 252, 251

(56) References Cited

U.S. PATENT DOCUMENTS

| | | | |
|---|---|---|---|
| 3,594,039 A | * | 7/1971 | Harp |
| 3,876,247 A | * | 4/1975 | Chilewich |
| 4,195,879 A | * | 4/1980 | Miller |
| 4,521,052 A | * | 6/1985 | Cone |
| 4,773,709 A | * | 9/1988 | Slinkard |
| 5,421,637 A | * | 6/1995 | Lemburg |
| 5,482,352 A | * | 1/1996 | Leal et al. |
| 5,697,671 A | * | 12/1997 | Shavitz |
| 5,779,306 A | * | 7/1998 | Ohlsson |
| 6,007,572 A | * | 12/1999 | Baldwin |

OTHER PUBLICATIONS

Kolpin Product Magazine, pp. 1–36.

* cited by examiner

*Primary Examiner*—Milton Nelson, Jr.
(74) *Attorney, Agent, or Firm*—Brain G. Gilpin; Godfrey & Kahn, S.C.

(57) ABSTRACT

An accessory for an all-terrain vehicle having a rear deck behind the operator includes a base, mountable on the rear deck of the vehicle; at least one closeable compartment on the base portion, for storing items; a removable chair attachable to the base, having a padded seat and a backrest connected to the padded seat by adjustable straps; and a padded portion on the base, for resting a portable cooler.

17 Claims, 2 Drawing Sheets

ATV REAR GEAR BAG

BACKGROUND OF THE INVENTION

The present invention relates to a vehicle accessory, and particularly to an accessory for all-terrain vehicles.

SUMMARY OF THE INVENTION

An accessory for an all-terrain vehicle having a rear deck behind the operator, the accessory comprising:
  a) a base portion, adapted to be mounted on the rear deck of the vehicle;
  b) at least one closeable compartment on the base portion, adapted to store items;
  c) a chair portion removably attachable to the base portion, the chair portion further comprising a padded seat and a backrest connected to the padded seat by adjustable straps; and
  d) a padded portion on the base portion, adapted to rest a portable cooler thereon.

A principal object and advantage of the present invention is that it has a chair portion on which the operator may sit when the vehicle is not in motion.

A feature of the present invention is that the chair portion is detachable from the accessory for use in a location away from the vehicle.

Another feature of the present invention is that it has at least one closeable compartment for storing items.

Another feature of the present invention is that it has a padded portion to rest a portable cooler on.

DETAILED DESCRIPTION OF THE PREFERRED EMBODIMENT

Figure 1:
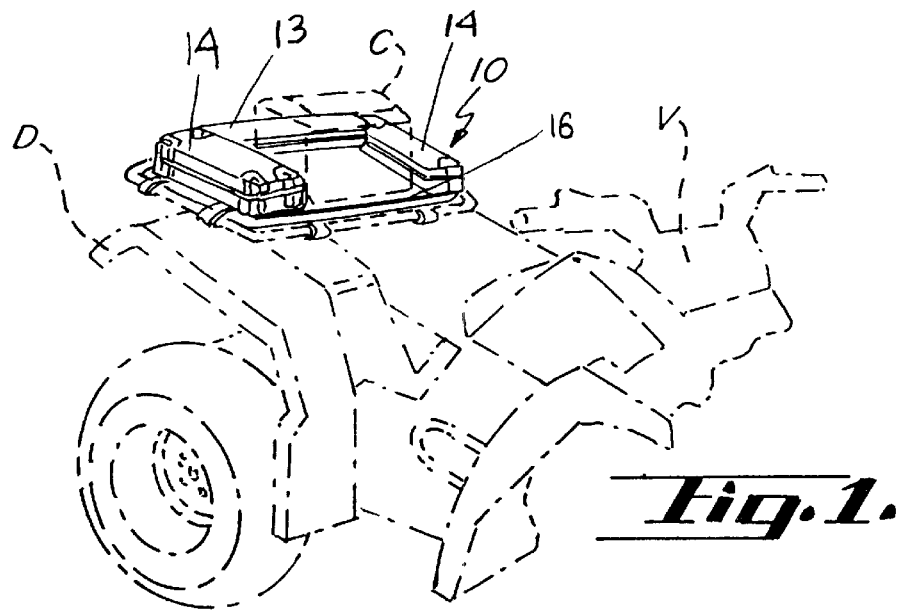
FIG. 1 is a partial perspective view of a vehicle showing the vehicle accessory of the present invention attached thereto.

The vehicle accessory of the present invention is generally shown in the Figures as reference numeral 10.

The vehicle accessory 10 is preferably attachable to the rear deck D of an all-terrain vehicle (ATV) V.

The vehicle accessory 10 comprises: a base portion 12, adapted to be mounted on the vehicle V, preferably on the rear deck D; at least one closeable compartment 14 on the base portion 12, adapted to store items; and a chair portion 16.

The chair portion 16 is preferably detachable from the base portion 12.

When the chair portion 16 is not in use, it folds flat against the base portion 12.

Preferably, the chair portion 16 includes a padded seat 18 that is attached to the base portion 12, and a backrest 20. Adjustable straps 22 attach the backrest 20 to the padded seat 18 and prevent the backrest 20 from collapsing under the weight of a person sitting on the chair portion 16. The backrest 20 is foldable against the padded seat 18.

The accessory 10 also includes a padded portion 24 adapted to rest a portable cooler C thereon.

Figure 4:
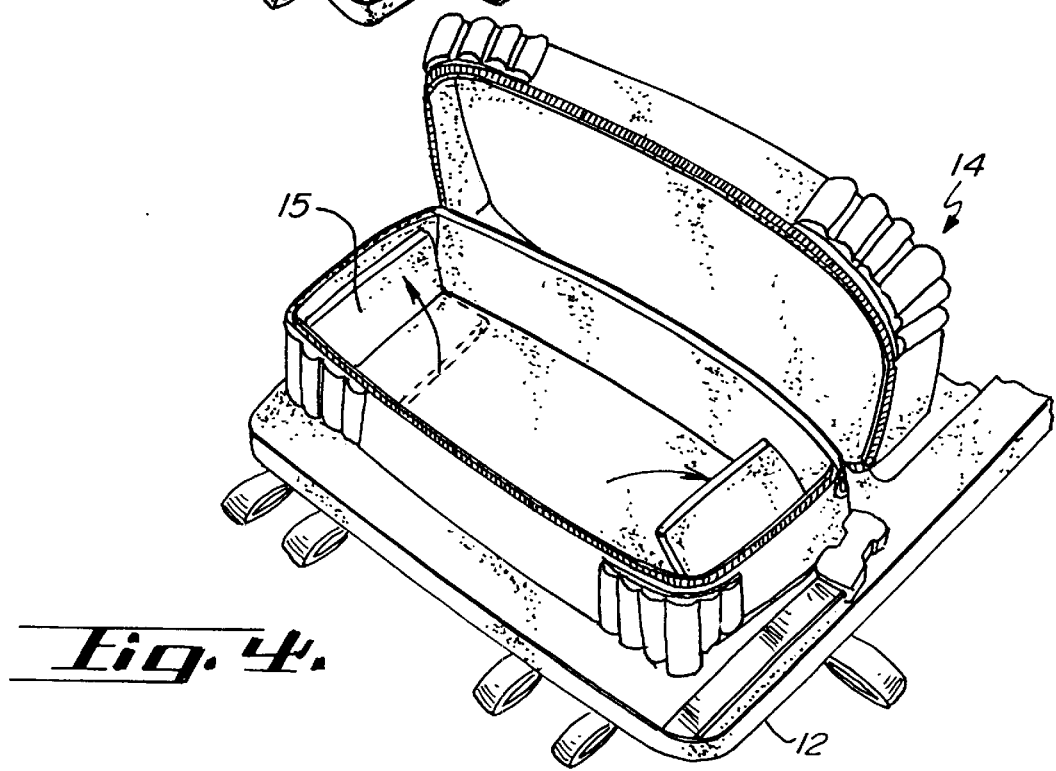
FIG. 4 is a perspective view of one of the closed compartments of the present invention, showing the operation of the internal brace.

The closeable compartment 14 is preferably designed so as to have an interior brace 15 adapted to hold the compartment 14 in an extended configuration, as shown in FIG. 4. The closeable compartment 14 may be collapsed by disengaging the interior brace 15. Thus, closeable compartment 14 can collapse down to a smaller size and stay that way even after the compartment is closed.

Figure 2:
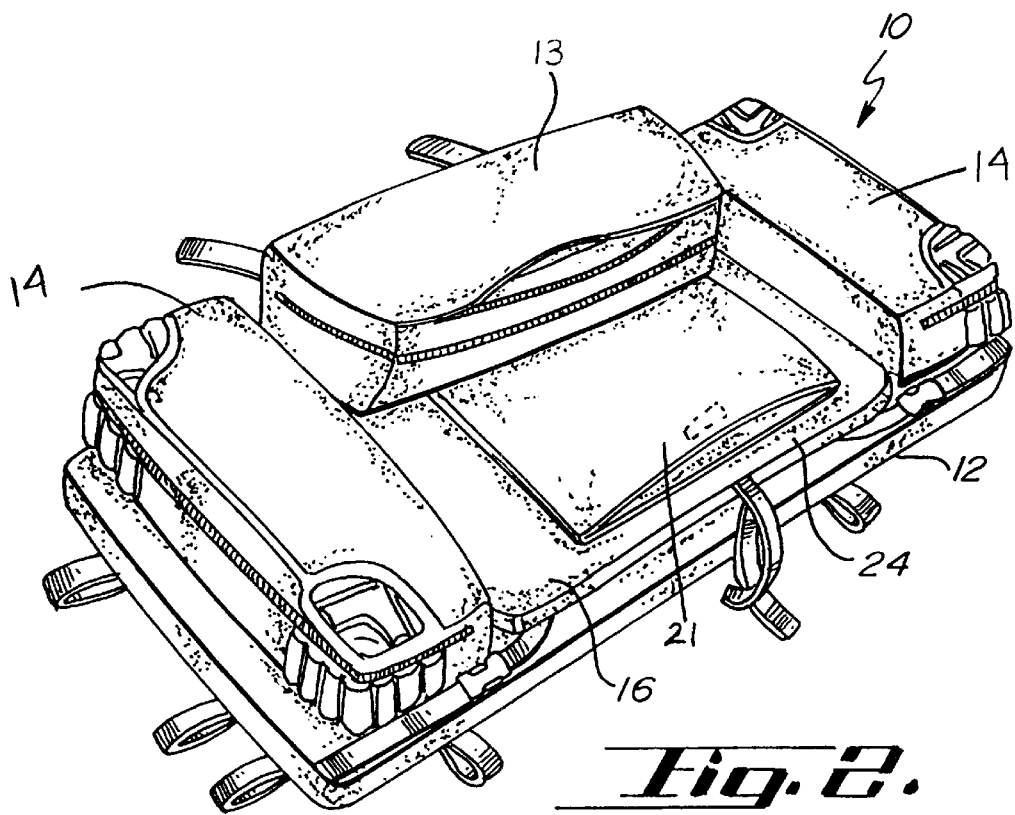
FIG. 2 is a perspective view of the vehicle accessory of the present invention with the backrest folded flat against the base.
Figure 3:
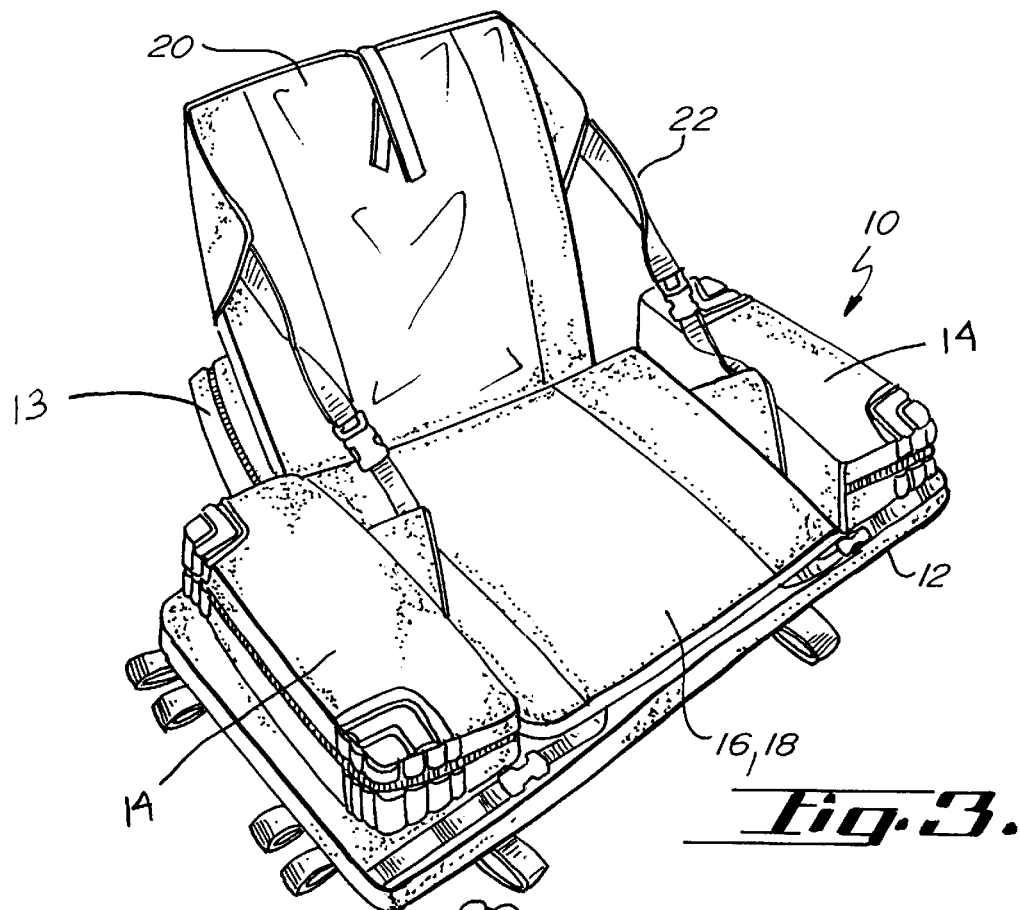
FIG. 3 is the same as FIG. 2, with the backrest raised away from the base.

As shown in FIGS. 1, 2 and 3, the base portion 12 is relatively wide as compared to the seat or chair portion 16. This extra width can accommodate at least one closeable compartment 14. When the chair portion 16 is in a closed position, two closeable compartments 14 on opposite sides of chair portion 16 and another closeable compartment 13 attached to the rear side of the backrest 20 together form a u-shaped recess 21 to aid in keeping a portable cooler "C" in place on the base portion 12. When the cooler is removed and the backrest 20 is in an upright position, the accessory may be used as a place to sit when the vehicle is not in motion.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A vehicle accessory, comprising:
  a) a base portion, adapted to be mounted on the vehicle;
  b) at least one closeable compartment on the base portion, adapted to store items; and
  c) a chair portion, wherein the base portion is wider than the chair portion to accommodate at least one closeable compartment thereon next to a side of the chair portion, the chair portion is detachable from the base portion and folds flat against the base portion when not in use.

2. The vehicle accessory of claim 1, further comprising a padded portion on the base portion, adapted to rest a portable cooler thereon.

3. The vehicle accessory of claim 1, wherein at least one closeable compartment further comprises an interior brace adapted to hold the compartment in an extended configuration, and wherein the closeable compartment may be collapsed by disengaging the interior base.

4. The vehicle accessory of claim 1, wherein the chair portion further comprises a padded seat attached to the base portion.

5. The vehicle accessory of claim 4, wherein the padded seat is removably attached to the base portion.

6. The vehicle accessory of claim 4, wherein the chair portion further comprises a backrest.

7. The vehicle accessory of claim 6, further comprising adjustable straps attaching the backrest to the padded seat and adapted to prevent the backrest from collapsing under the weight of a person.

8. The vehicle accessory of claim 7, wherein the backrest is foldable upon the padded seat.

9. An accessory for an all-terrain vehicle having a rear deck, the accessory comprising:
  a) a base portion, adapted to be mounted on the rear deck of the vehicle;
  b) at least one closeable compartment on the base portion, adapted to store items; and c) a chair portion separate from the closeable compartment and removably attachable to the base portion, the chair portion further comprising a padded seat and a backrest connected to the padded seat by adjustable straps.

10. The vehicle accessory of claim 9, further comprising a padded portion on the base portion, adapted to rest a portable cooler thereon.

11. The vehicle accessory of claim 9, wherein at least one closeable compartment further comprises an interior brace adapted to hold the compartment in an extended configuration, and wherein the closeable compartment may be collapsed by disengaging the interior brace.

12. The vehicle accessory of claim 9, wherein the chair portion folds flat against the base portion when not in use.

13. The vehicle accessory of claim 9, wherein the backrest is foldable upon the padded seat.

14. An accessory for an all-terrain vehicle having a rear deck, the accessory comprising:

a) a base portion, adapted to be mounted on the rear deck of the vehicle;

b) at least one closeable compartment on the base portion, adapted to store items;

c) a chair portion separate from the closeable compartment and removably attachable to the base portion, the chair portion further comprising a padded seat and a backrest connected to the padded seat by adjustable straps; and d) a padded portion on the base portion, adapted to rest a portable cooler thereon.

15. The vehicle accessory of claim 14, wherein the backrest is foldable upon the padded seat.

16. The vehicle accessory of claim 14, wherein at least one closeable compartment further comprises an interior brace adapted to hold the compartment in an extended configuration, and wherein the closeable compartment may be collapsed by disengaging the interior brace.

17. The vehicle accessory of claim 14, wherein the chair portion folds flat against the base portion when not in use.

* * * * *